Figure 1:
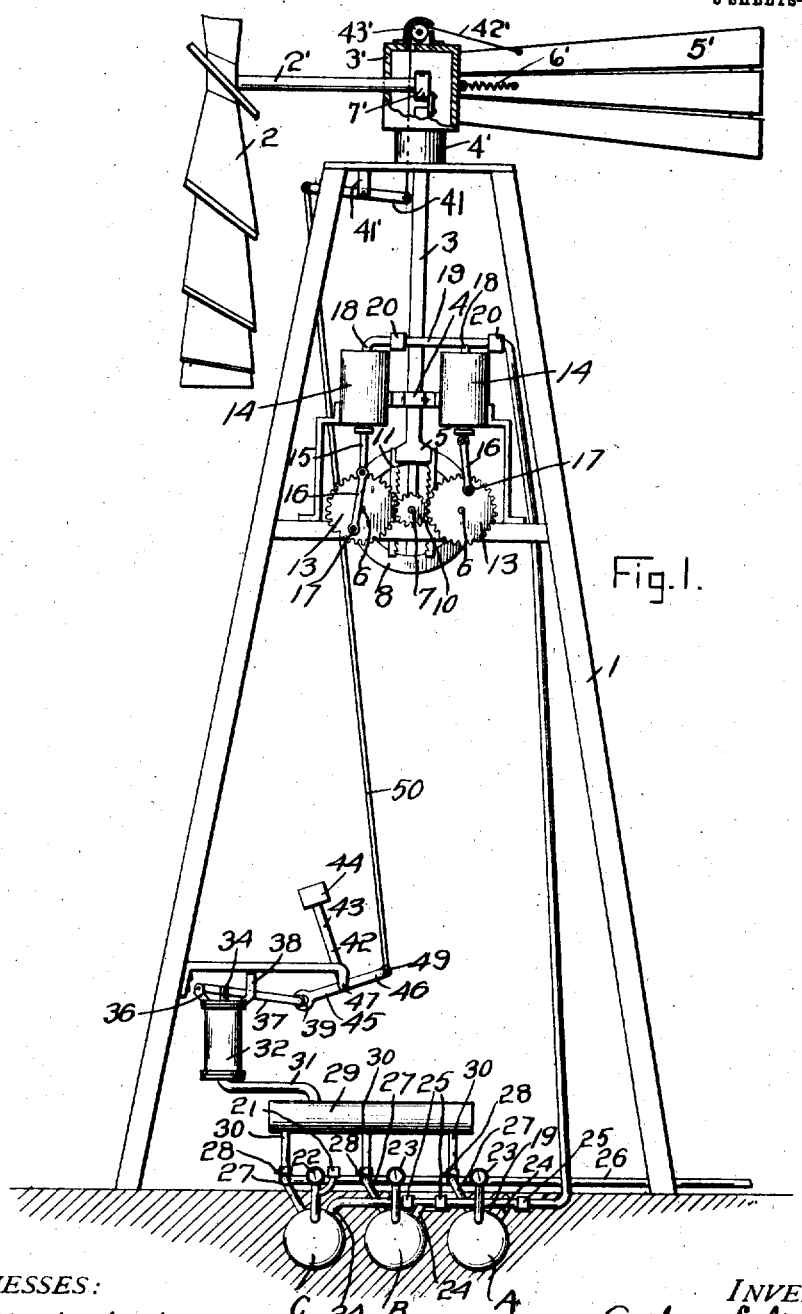

A. E. GARDNER.
APPARATUS FOR STORING POWER.
APPLICATION FILED MAY 21, 1907.

903,372.

Patented Nov. 10, 1908.
3 SHEETS—SHEET 1.

WITNESSES:
C. H. Reichenbach
John Powers

INVENTOR
Arthur E. Gardner
BY Chandler & Chandler
Attorneys

A. E. GARDNER.
APPARATUS FOR STORING POWER.
APPLICATION FILED MAY 21, 1907.
903,372.
Patented Nov. 10, 1908.
3 SHEETS—SHEET 2.
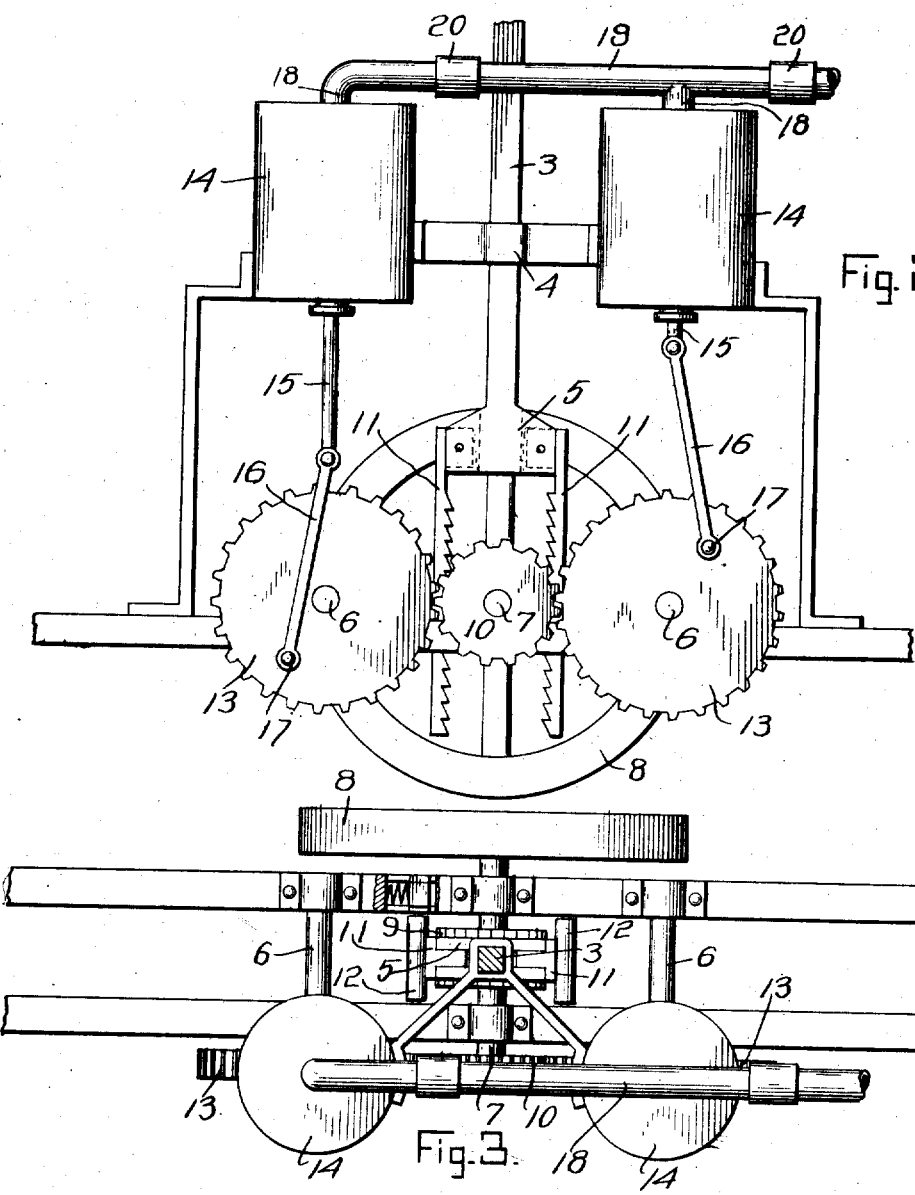
WITNESSES:
INVENTOR
Arthur E. Gardner
BY
Attorneys

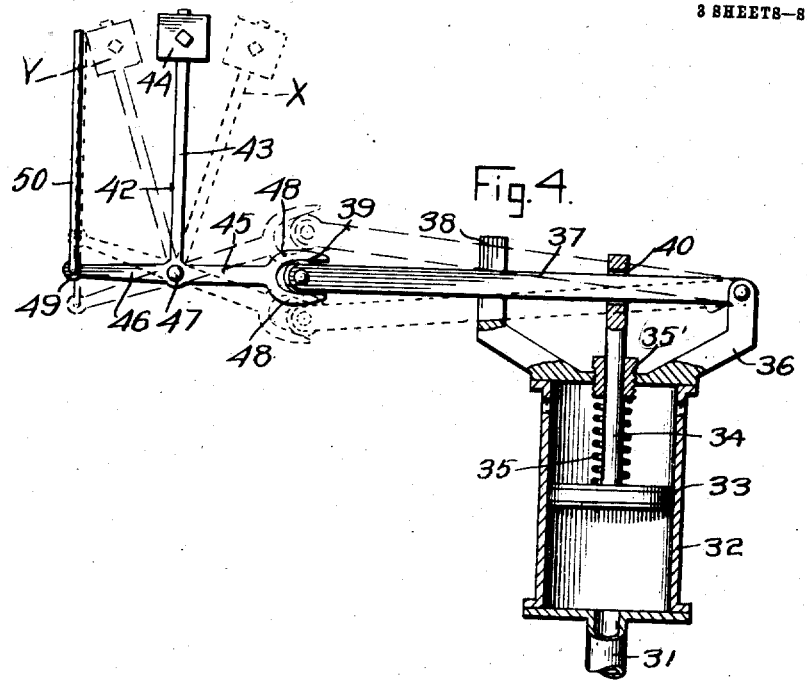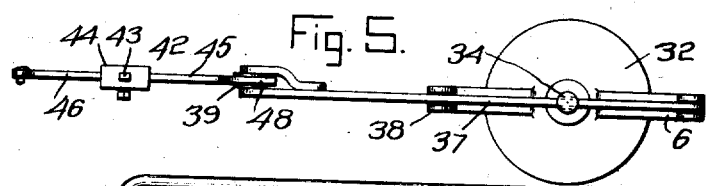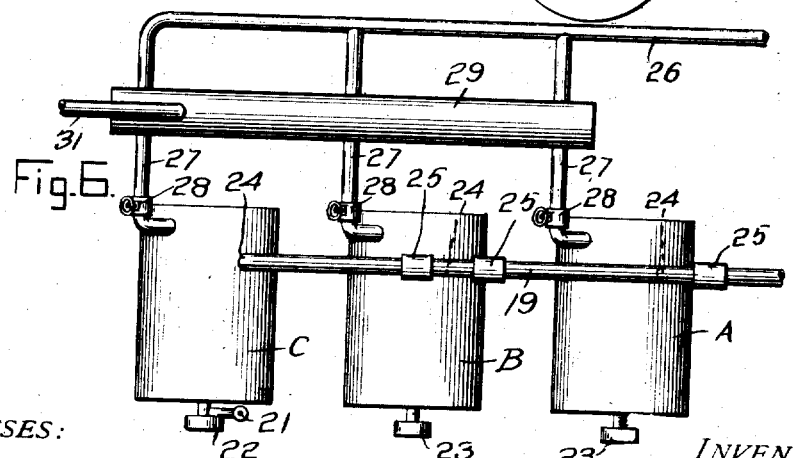

UNITED STATES PATENT OFFICE.

ARTHUR E. GARDNER, OF CANAAN, NEW HAMPSHIRE.

APPARATUS FOR STORING POWER.

No. 903,372.　　　　　Specification of Letters Patent.　　　Patented Nov. 10, 1908.

Application filed May 21, 1907. Serial No. 374,840.

*To all whom it may concern:*

Be it known that I, ARTHUR E. GARDNER, a citizen of the United States, residing at Canaan, in the county of Grafton, State of New Hampshire, have invented certain new and useful Improvements in Apparatuses for Storing Power; and I do hereby declare the following to be a full, clear, and exact description of the invention, such as will enable others skilled in the art to which it appertains to make and use the same.

This invention relates to new and useful improvements in apparatuses for storing power and it has particular reference to a wind mill and means for pumping air upon the operation of the wind mill into a battery of storage tanks.

Generally speaking the invention includes a wind mill, gearing between the reciprocating wind mill rod and the pumps, a battery of storage tanks, a conductor between the pumps and the storage tanks and fluid pressure controlling means for moving the vanes of the mill into and out of the wind in accordance with the variations of pressure, incident to use in the storage tanks.

In connection with a wind mill of the above type the invention aims as a primary object to provide fluid pressure controlling means as above outlined which shall embody a novel construction, combination and arrangement of parts.

The details of construction will appear in the course of the following description in which reference is had to the accompanying drawings forming a part of this specification, like characters of reference designating similar parts throughout the several views, wherein:

Figure 1 is a view of diagrammatic nature illustrating the system as an entirety. Fig. 2 is a detailed side elevation of the gearing between the reciprocating wind mill rod and the pumps above referred to. Fig. 3 is a top plan view of such gearing. Fig. 4 is a detailed side elevation partly in section showing the connections for moving the wind mill into and out of the wind. Fig. 5 is a top plan view of such connections. Fig. 6 is a detailed view showing the arrangement of the battery of storage tanks and their adjuncts.

Referring to the accompanying drawings the numeral 1 designates the windmill frame of ordinary construction upon the top of which is mounted the windmill 2 the latter having a shaft 2' journaled in a head 3' rotatably supported on a fixed hollow collar 4' mounted centrally of the frame 1. Hingedly connected to the rotatable head is a vane plate 5' normally held in the wind by a tension spring 6' having its free ends connected to said vane plate and head. On the inner end of the shaft 2' is the disk wheel 7' having link connection with a vertical reciprocating rod 3 movable through suitable bearings 4 and provided at its lower end with an enlarged head 5. Between the bars of the frame 1 are supported parallel transverse shafts 6 and a centrally located shaft 7 the latter carrying a balance wheel 8, a centrally located ratchet wheel 9 and the pinion 10. Pivoted to each side of the head 5 are rack bars 11, having their teeth oppositely disposed and formed to continuously rotate the ratchet wheel 9 and the shaft 7 during the reciprocation of the rod 3. For the purpose of holding the rack bars 11 in engagement with the ratchet wheel 8 spring pressed rollers 12 are provided which bear against said bars and force them inwardly on their pivots.

Mounted upon the shafts 6 are pinions 13 which are in mesh with and are driven from the pinion 7. The frame 1 supports pump cylinders 14 in which pistons (not shown) are mounted for vertical movement and the piston rods 15, which move in the cylinders 14 are pivoted at their outer ends to links or pitmen 16, the latter having eccentric pivotal connection as at 17 with the pinions 13. As arbitrarily shown, two pump cylinders 14 are employed and discharge pipes 18 lead from the upper ends thereof and have connection with a pipe 19, the latter leading to the battery of storage tanks above referred to. A check valve 20 is interposed in the pipe 19 between the cylinders 14 to prevent backward escape of air from one cylinder into the other.

The storage tanks are designated by the characters A, B and C, the tank C which is disposed at the farthest end of the pipe 19 being provided with a safety valve 21 and with a pressure gage 22.

Pressure gages 23 are likewise employed in connection with the tanks A and B. The pipe 19 has connection with the several tanks A, B and C by means of branch pipes 24 and check valves 25 are provided in the pipe 19 in advance of said branch pipes. A distributing pipe 26 has connection with the several tanks A, B and C by means of branch pipes 27 in which are provided hand valves 28. The pipes 27 are connected in advance of the valves 28 with a manifold 29, by means of branch pipes 30, and a service pipe 31 leads from the manifold to a cylinder 32. A piston 33 is mounted for vertical movement in the latter and its rod 34 is projected through the upper end of the cylinder 31. An expansive coil spring 35 surrounds said rod within the cylinder and tends to force the piston 33 downwardly against the pressure of the air introduced into the cylinder through the pipe 31. Upon the top of the cylinder 32 is a projecting bracket 36 which has pivotal connection with the end of a lever 37, the latter working through a guide bracket 38 and at its front end carrying a friction roller 39. The rod 34 is slotted as at 40 and the lever 37 is projected through the same. The wind mill 2 is mounted in any conventional manner to be swung into and out of the wind upon the movement of a lever 41. Said lever 41 is pivotally connected to a depending lug 41' and the free end thereof is connected to a flexible cable 42' passing over a pulley 43' suitably supported at the top of the head 3' and its opposite end connected to the vane plate 5' so that the latter can be moved out of the wind. Pivotally mounted adjacent the cylinder 32 is a member 42 which includes a central vertical arm 43 carrying at its upper end a weight 44 and horizontal arms 45 and 46 projecting on each side of the arm 43 and of the pivot 47 for the member 42. The arm 45 is constructed at its end with spaced fingers 48 which overlie one another in slightly convergent relation and afford a yoke it being understood that the fingers 48 are engaged on each side of the roller 39. The arm 46 is formed at its end with an eye 49 and is connected by means of a rigid link 50 with the lever 41.

The weight 44 is merely the counterbalancing element to insure the efficient operation of the member 42. The spring 35 incidentally partakes of the nature of a cushioning element to prevent vibration upon the movement of the piston 33, but said spring is likewise a means for regulating the normal pressure of air in the system in excess of which, or below which the piston 33 is moved in either direction by fluid pressure, or by the pressure of said spring, and to the end of regulating the tension of the spring 35 a nut 35' is threaded through the head of the cylinder 31 and surrounds the rod 34. Rotation of said nut in either direction will increase or decrease the tension of the spring 35 as will be readily understood.

In the course of use or for any well known reasons, should the pressure in the battery of tanks A, B and C fall below a determinate degree, the tension of the spring 35 will overcome the pressure of fluid within the pipe 31, and will force the piston 33 downwardly. In this action the lever 37 is rocked downwardly by virtue of the connections described, and said lever will rock the member 42 to the dotted line position X. In such position of the member 42, the lever 41 will be rocked to throw the wind mill into the wind and thus attain a maximum degree of pumping power. When the pressure in the system exceeds a determinate degree, the piston 32 is forced upwardly against the tension of the spring 35 and the member 42 is moved in a reverse direction to the dotted line position Y, in which action the lever 41 is rocked to move the wind mill out of the wind. It will of course be understood that the movement of the piston 33 is in accordance with the variations of pressure in the system and that the member 42, when the pressure is at the normal determinate degree will be sustained in the full line position.

It is preferred to mount the tanks A, B and C in a suitable vault or subway beneath the surface level in order that said tanks together with their adjuncts may be protected from the influence of the elements.

A system constructed in accordance with the present invention is comparatively inexpensive to install and is highly efficacious in operation.

From the foregoing description it will be seen that simple and efficient means are provided for accomplishing the objects of the invention, but while the elements herein shown and described are well adapted to serve the functions set forth, it is obvious that various minor changes may be made in the proportions, shape and arrangement of the several parts, without departing from the spirit and scope of the invention as defined in the appended claims.

What is claimed is:

1. In an apparatus of the type set forth, the combination with a wind mill having its vanes movable into and out of the wind and a reciprocating rod, of air pumps, operative connections between said rod and said pumps; a battery of storage tanks, a pipe between said pumps and said storage tanks, a distributing pipe, connections between said tanks and said pipe, an element for moving the vanes of said wind mill into or out of the wind and fluid pressure means operable upon the variations of pressure in said storage tanks in excess of or below a normal degree for correspondingly actuating said element to move said vanes.

2. In an apparatus of the type set forth, the combination with a wind mill having its vanes movable into and out of the wind, and a reciprocating rod operated from said wind mill, of pumps, gearing between said rod and said pumps, a battery of storage tanks, a pipe between said pumps and said storage tanks, a distributing pipe, connections between said distributing pipe and said storage tanks, a lever for moving the vanes of the wind mill into or out of the wind, a cylinder, means forming communication between said connections and said cylinder, a piston movable in said cylinder, a rod carried by said piston and projecting through one end of said cylinder, an adjustable spring surrounding said rod, a pivoted lever, said lever having operative connection with said rod, a pivoted member including a vertical arm and a weight carried thereby, and arms on either side of said vertical arm and of the pivot of said member, one of said arms having operative connection with said first-mentioned lever, to move the same into either direction upon operative movement of said member, and the other of said arms having operative connection with said last-named lever.

In testimony whereof, I affix my signature, in presence of two witnesses.

ARTHUR E. GARDNER.

Witnesses:
FLORA E. SARGENT,
ALBION W. ROLLINS.